(12) United States Patent
Butti et al.

(10) Patent No.: US 8,724,506 B2
(45) Date of Patent: May 13, 2014

(54) DETECTING DOUBLE ATTACHMENT BETWEEN A WIRED NETWORK AND AT LEAST ONE WIRELESS NETWORK

(75) Inventors: Laurent Butti, Issy Les Moulineaux (FR); Eric Leclerq, Brussels (BE); Franck Veysset, Paris (FR)

(73) Assignee: France Telecom, Paris (FR)

( * ) Notice: Subject to any disclaimer, the term of this patent is extended or adjusted under 35 U.S.C. 154(b) by 577 days.

(21) Appl. No.: 11/988,559

(22) PCT Filed: Jun. 28, 2006

(86) PCT No.: PCT/FR2006/001510
§ 371 (c)(1),
(2), (4) Date: Jan. 16, 2009

(87) PCT Pub. No.: WO2007/010103
PCT Pub. Date: Jan. 25, 2007

(65) Prior Publication Data
US 2009/0213752 A1  Aug. 27, 2009

(30) Foreign Application Priority Data
Jul. 18, 2005  (FR) ...................................... 05 07608

(51) Int. Cl.
*H04L 12/28* (2006.01)
(52) U.S. Cl.
USPC .......................................... 370/254; 370/401
(58) Field of Classification Search
USPC .................. 370/254, 395.54, 401; 455/554.2
See application file for complete search history.

(56) References Cited

U.S. PATENT DOCUMENTS

| 4,600,962 | A  | * | 7/1986  | Bliehall ........................... 361/77 |
| 7,433,673 | B1 | * | 10/2008 | Everson et al. ............ 455/404.1 |
| 2004/0003285 | A1 |   | 1/2004  | Whelan et al. |
| 2004/0266424 | A1 | * | 12/2004 | Park et al. .................. 455/426.1 |
| 2004/0266479 | A1 | * | 12/2004 | Oak .............................. 455/557 |
| 2005/0239496 | A1 | * | 10/2005 | Sylvain ...................... 455/552.1 |
| 2005/0260973 | A1 | * | 11/2005 | van de Groenendaal ..... 455/411 |
| 2006/0002331 | A1 | * | 1/2006  | Bhagwat et al. .............. 370/328 |
| 2006/0023651 | A1 | * | 2/2006  | Tsuchiuchi et al. .......... 370/310 |
| 2006/0075124 | A1 | * | 4/2006  | Dougherty et al. ........... 709/228 |
| 2006/0085543 | A1 | * | 4/2006  | Hrastar et al. ................ 709/224 |
| 2006/0179472 | A1 | * | 8/2006  | Chang et al. ....................... 726/2 |
| 2009/0276508 | A1 | * | 11/2009 | Miyake et al. ................ 709/220 |

FOREIGN PATENT DOCUMENTS

EP  1 542 406  6/2005
WO  WO 03/093951  11/2003

OTHER PUBLICATIONS

IEEE, "IEEE Standard for Local and Metropolitan Area Networks: Overview and Architecture IEEE Std 802-2001," Feb. 7, 2002, The institute of Electrical and Electronics Engineers, Inc., p. 33.*

\* cited by examiner

*Primary Examiner* — Dang Ton
*Assistant Examiner* — Ryan Kavleski
(74) *Attorney, Agent, or Firm* — Knobbe Martens Olson & Bear LLP

(57) ABSTRACT

The invention concerns the detecting of a double attachment of an equipment communicating both with a wireless network and with a wired network, in particular when the connections with said networks are established by sending a connection configuration request comprising an identifier of the equipment, such as DHCP Host Name. The invention is characterized in that it consists: a) in detecting, at least on the wireless network, connection configuration requests emitted by the equipments (E10), b) analyzing the contents of the requests and extracting the equipment identifiers (E11), c) from one equipment identifier extracted at step b), determining whether said equipment has additionally sent a connection configuration request at least to the wired network with the same identifier (E13), and d) triggering an alarm if the result at step c) is positive (E16).

12 Claims, 3 Drawing Sheets

DETECTING DOUBLE ATTACHMENT BETWEEN A WIRED NETWORK AND AT LEAST ONE WIRELESS NETWORK

This application claims the benefit of PCT Patent Application No. PCT/FR2006/001510, filed Jun. 28, 2006, which claims the benefit of French Patent Application No. 05 07608, filed Jul. 18, 2005, which are both hereby incorporated by reference in their entirety.

The present invention relates, in a general way, to the detection of a risk of fraudulent misuse of private data (a "payload" in English terminology) in a communication.

BACKGROUND OF THE INVENTION

In particular, wireless networks, especially those specified in the standards IEEE802.11 of 1997 and 1999, are currently greatly used in "Hot-Spots", Business or Residential contexts using the technique commonly called "Wi-Fi". The principle is as follows: a mobile terminal, such as a portable computer, is provided with a communications interface of the Wi-Fi type with a wireless network, this network itself being connected to a wired network, for example a local network of a company or an extended network like the Internet. This system thus makes it possible for a user of the mobile terminal to connect himself to the wired network whilst being in a state of mobility.

This technique provides new uses, but also gives rise to certain vulnerabilities. In fact, access to a wired network via a wireless interface can give rise to risks of malicious misuse of private data if access to the wired network (by any person by radiofrequency means) is not controlled.

The situation is particularly sensitive in the "company wireless networks" context where the threat essentially arises from roaming equipments such as portable computers which (as standard) by default house an integrated Wi-Fi card. These computers can have configurations which by default automatically connect to any: open Wi-Fi network. The term "open" is understood to mean that the network then becomes directly accessible without authentication or encoding of the radio channel. Security problems therefore arise because equipments of the company are connected to unknown Wi-Fi networks. If the portable computer is also connected to the local network of the company via its wired network (for example with an Ethernet network card), the portable computer is then in a situation referred to as "double attachment" (DA). This situation is critical for the security of the company's network because that network can be interconnected with an unknown network without any access control, the computer thus interconnected with these two networks offering attackers the possibility of flipping from one network to the other.

As a current solution, tools exist which make it possible to avoid double attachment between a wired network and a wireless network, but this solution necessitates an installation of the tool on all of the equipments of the portable computer type. However, there are many cases where it appears difficult to install these tools on all of the portable computers which connect to a company, in particular when it is a matter of test computers, computers not belonging to the company or other computers. More generally, this measure thus involves the control of all of the equipments communicating with the wireless network. Unfortunately, this is not always the case in a company, in particular when it has a large amount of portable computers. Similarly, it is possible that the tool making it possible to prevent double attachment is not activated for some reason or other.

Even though it is an extremely critical problem for the security of a company, at present there is no technique for detecting a double attachment between a wired network and a wireless network which is usable and efficient both on controlled and on non-controlled equipments of the company.

SUMMARY OF THE INVENTION

The present invention aims to improve the situation. For this purpose it proposes a method of detecting a double attachment situation of a communicating equipment, this equipment comprising means of communication with a wireless network, on the one hand, and with a wired network, on the other hand, the double attachment situation being defined by a connection of the equipment both with the wireless network and with the wired network.

According to the invention, the fact that the connections with the wired network and with the wireless network are established by sending a request from the equipment is exploited, this request comprising an identifier of the equipment, according to a predetermined connection configuration protocol. Thus the method proposed by the invention can be defined by the following steps:
  a) connection configuration requests sent by one or more equipments are monitored, at least on the wireless network,
  b) the content of these connection configuration requests is analyzed and equipment identifiers are extracted from them,
  c) from an equipment identifier extracted in step b), it is determined if this equipment has also sent a connection configuration request at least to the wired network with the same identifier, and
  d) an alarm is raised if the result of step c) is positive.

The present invention also relates to a device for the implementation of the method, comprising:
  a) probe means at least for the wireless network, in order to detect connection configuration requests sent by one or more equipments,
  b) means for analyzing the content of these connection configuration requests and of extraction of the equipment identifiers in these requests,
  c) means of comparison for determining, from an extracted equipment identifier, if that equipment has also sent a connection configuration request at least to the wired network with the same identifier, a positive determination characterizing a possible double attachment, and
  d) alarm means for raising an alarm in the event of a positive determination.

The present invention also relates to a computer program, downloadable via a telecommunications network and/or intended for storage in a memory of a device and/or stored on a memory medium intended to cooperate with a reader of that device, that device, for the implementation of the above method, comprising:
  a) probe means of at least the wireless network, for detecting connection configuration requests sent by one or more equipments.

The computer program according to the invention therefore comprises instructions which, when they are executed on the aforesaid device, carry out steps b), c) and d) of the above method.

The present invention also relates to a data storage medium comprising computer program code instructions for the execution of the steps of a method such as defined above.

In a first embodiment of the invention:
a) both the wireless network and the wired network are monitored for connection configuration requests sent by one or more equipments,
b) the content of these requests is analyzed and equipment identifiers are extracted from them, both for the requests sent on the wireless network and for the requests sent on the wired network,
c) by comparison of the equipment identifiers in the requests on the wired network, on the one hand, and on the wireless network, on the other hand, it is determined if an equipment has sent connection configuration requests both on the wired network and on the wireless network with the same identifier, and
d) an alarm is raised if the result of step c) is positive.

A timing delay of chosen duration is preferably applied between a positive comparison in step c) and an effective raising of the alarm in step d).

In a second embodiment, in which it is possible to access connection configuration information in at least one server connected to the wired network:
a) connection configuration requests sent by one or more equipments are monitored, at least on the wireless network,
b) the content of the connection configuration requests is analyzed and equipment identifiers are extracted from them,
c) the said server is interrogated on the basis of an equipment identifier extracted in step b) in order to determine if that equipment has also sent a connection configuration request at least to the wired network with the same identifier, and
d) an alarm is raised if the result of step c) is positive.

A same entity can manage both the wireless network and the wired network. In this case, that same entity can access connection configuration information on a first server connected to the wired network and, additionally, on a second server connected to the wireless network, and in this second embodiment:
a) connection configuration requests sent by one or more equipments are monitored on both the wireless network and on the wired network,
b) the content of the connection configuration requests is analyzed and equipment identifiers are extracted from it,
and, in step c), the first server or the second server is interrogated, on the basis of an equipment identifier extracted in step b) from a request received on the wireless network or on the wired network respectively.

In general, provision will preferably be made for the device intended for detections of double attachment:
between a wired network and a wireless network, managed by a same entity,
and between the wired network and any wireless network,
to comprise:
radio probe means for said any wireless network,
wired probe means for the wireless network which is managed by the entity, and
wired probe means for the wired network.

BRIEF DESCRIPTION OF THE DRAWINGS

Other features and advantages of the invention will appear on examining the following detailed description and the appended drawings in which.

DETAILED DESCRIPTION

Figure 1:
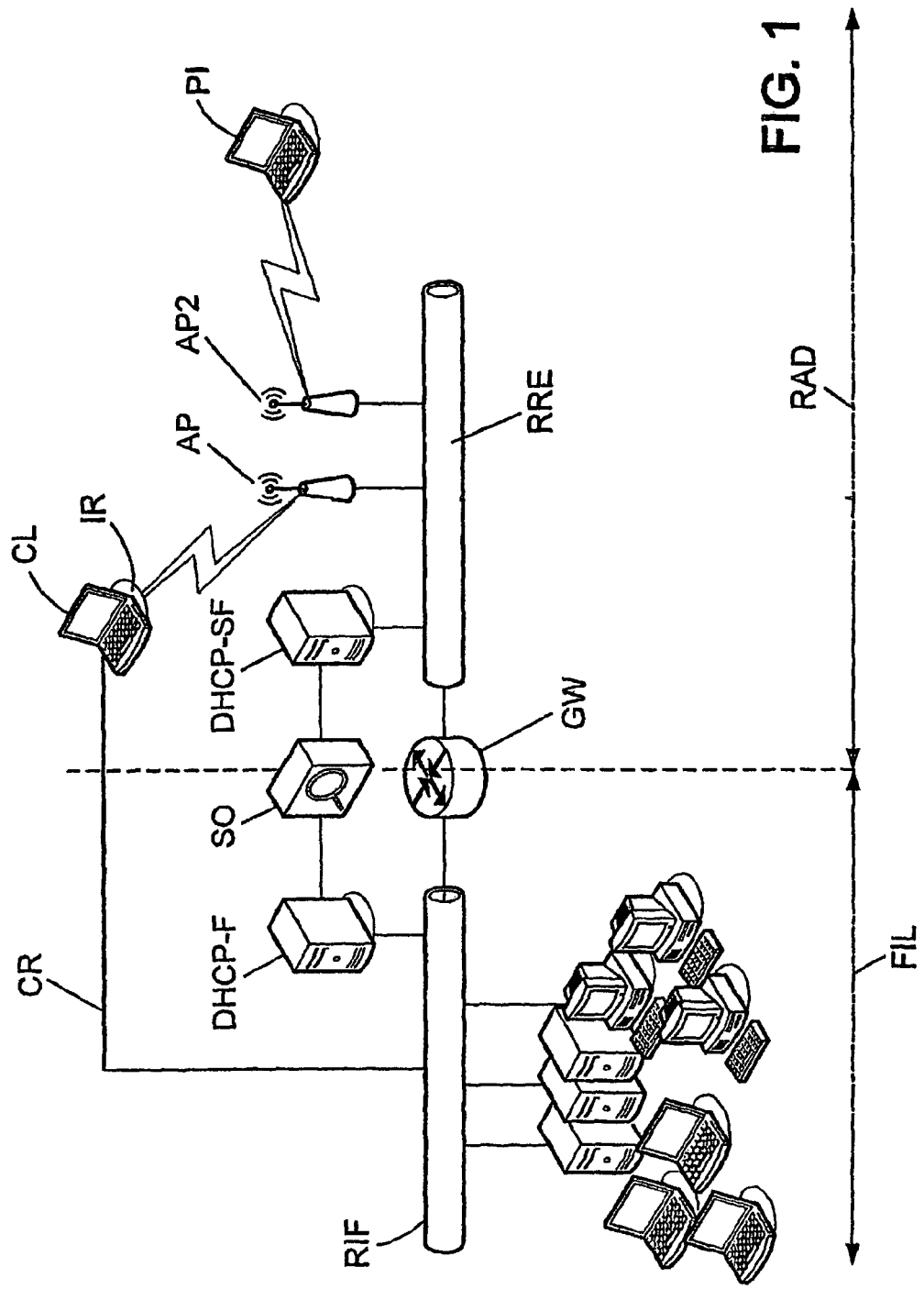
FIG. 1 is a diagrammatic illustration of an architecture in which a company controls two networks, a wired one and a wireless one, in a first context of application of the present invention.

The present invention proposes the detection of a communicating equipment CL, such as a portable computer, in a situation of double attachment between a wired network FIL and a wireless network RAD (FIG. 1), in particular of the Wi-Fi type. Its purpose is to raise alarms to an administrator, for example the administrator of the wired network, in order to undertake the actions necessary for disconnecting the equipment thus detected.

Before describing in detail the steps of the method according to the invention, the process of association with an access point, typically a hot-spot, is recalled below.

The process of association of a client with an access point can take place in several phases.

Firstly, two techniques are possible in order to discover the access point.

It is possible to provide monitoring of the radio channel in order to search for specific frames called "beacons". The equipment of the user (hereafter called the "client") looks at the information contained in this type of frame, for example the name of the network (or ESSID, the acronym for "Extended Service Set Identifier" in the terminology of the IEEE 802.11 standard) and the parameters of the deployed network (for example the radio capabilities in terms of the data rates supported).

Another possible technique consists in sending access point search frames called "Probe Request" containing the name of the sought network (ESSID). The access point or points respond to the request by sending a "Probe Response" thereby signaling their presence.

Depending on the items discovered above, the client selects the appropriate access point and requests to be authenticated with that access point.

If the authentication is successful, the client then requests association with that access point. There are two types of authentication: one of them in "Open" mode where any authentication request is accepted by default and the other in "Shared Secret" mode where the knowledge of a secret shared between the access point and the client is necessary for authentication at the point of access.

If the association succeeds, the client then is able to send and receive data via the access point to which he is connected. It is then possible for the client to use higher layer protocols, such as for example IP, for communication with other hosts. In order to do this he generally uses the DHCP (the acronym for "Dynamic Host Control Protocol") protocol. This measure allows the client to communicate with a DHCP server which will allocate him with the IP connectivity information in order to function correctly (typically an IP address, a sub-network mask, a default gateway address, addresses of so-called DNS (the acronym for "Domain Name System") servers, etc). This operating mode is widely used, in particular on portable computers since it is difficult to envisage having a static IP configuration for obvious ergonomic constraints.

The DHCP protocol is described hereafter, such as proposed in the RFC 2131 standard of the IETF.

The client sends a DHCP-DISCOVER request, the purpose of which is to search for the DHCP servers present on the network on which it is sending its request.

The DHCP servers present on the network which receive the request from the client then respond with a DHCP-OFFER response, containing the so-called "lease" offers intended for the client. It is recalled that the lease is a concept of the DHCP mechanism which makes it possible to allocate an IP address to a client for a certain duration. At the end of this lease, if the renewal of the lease has not been requested by the client, the DHCP server then considers that the lease is terminated and it can then again allocate the same IP address to a different client.

The client then chooses his suitable DHCP server and sends a DHCP-REQUEST request to the DHCP server of its choice, specifying the information requested with respect to the content of the proposals made in the previously received DHCP-OFFER responses.

The DHCP server which receives the DHCP-REQUEST request from the client validates it by returning a DHCP-ACK response or invalidates it by returning a DHCP-NACK response.

It will be remembered that the DHCP requests from the client are made, in concrete terms, at three times:
when the network interface is initialized, in order to retrieve the connection parameters;
half way through the lease allocated by the server, in order to verify that it is still in fact valid;
at the end of the lease, in order to renew the latter.

Thus, the detection of double attachment according to the invention will be able to take place during these sendings. The DHCP-DISCOVER and DHCP-REQUEST frames contain obligatory information as well as a certain number of options, added at the client's discretion.

Among these options, the following are of interest here:
option 12: "Host Name", corresponding to the name of the machine which is making the request;
option 55: "Parameters List", corresponding to the list of parameters that the client is requesting from the DHCP server;
option 60: "Vendor Class Identifier", corresponding to a value identifying the type of equipment which is making the request;
option 81: "FQDN" corresponding to the complete name of the machine which is making the request.

The purpose of options 12 and 81 is in particular the identification of the client which is making the request. They are commonly used for the automatic updating of the inputs of the DNS server. Option 81 is not present, in principle, in the DHCP-DISCOVER frames. It is recalled that the RFC 2132 standard on the DHCP protocol specifies the optional or obligatory nature of the fields referred to as "options". These options are however included in the DHP messages, generally at the discretion of the client and, in practice, most DHCP clients use options 12, 55, 60, 81 and at least the options 12 and 81 by default.

Thus, a company having an internal wired network (typically an Intranet), seeks to protect itself from double attachments. The client equipment (for example a portable computer) is connected to this local wired network. The wired interface (for example an Ethernet network card) retrieves an IP address by means of the DHCP exchanges with a DHCP server situated on the company's local network. The use of the DHCP protocol is common in company networks because is avoids using a fixed IP address, more especially as the portable computers move from network to network and it is therefore extremely practical to be able to retrieve the connectivity information of the network on which the portable computer is situated by means of the DHCP protocol.

Control of the wired network by a network administrator implies that it is therefore possible:
to be up to date with the DHCP requests and responses that are made on that same network (either by interfacing with the DHCP server or by passive monitoring on the network);
to transmit packets to any machine present on that network (by simple packets or by complete communications).

When the same client equipment has an activated IEEE 802.11 radio interface, it is thus potentially in double attachment. If it is effectively connected to a Wi-Fi network, it is then necessarily in a double attachment situation. This situation can give rise to critical vulnerabilities both for the client's equipment and particularly for the company's networks because this interconnection opens a breach in the whole of the company's security.

Two possible cases can therefore be distinguished in practice, as follows.

The Wi-Fi network to which the client connects can be controlled by the company. This is typically a legitimate access via an open access point on which the client can then establish a secure connection. This network will be called the "Wi-Fi network of the company". It is constituted by a set of Wi-Fi access points, interconnected by a wired network.

In another way, the Wi-Fi network to which the client connects can be not controlled by the company. An illegitimate access point can then occur (corresponding to a voluntary attack aimed at creating a double attachment so that the attacker can flip, via the client equipment in a double attachment situation, to the company's wired network). It can also be an interfering access point (typically an incorrectly configured open access point belonging to a neighboring network or a public access such as a hot spot).

The present invention uses a probe corresponding to a network equipment, controlled by the company, and whose function is to detect double attachments. As will be seen below, this probe carries out monitoring on the wired network and on the radio network. The purpose is to carry out a grouping of information present in the DHCP protocol, this information being both transmitted from the wired interface and from the wireless interface of the same client equipment. The method is based on a principle according to which the information contained in the DHCP protocol makes it possible to know certain characteristics which are specific to the client, which therefore makes it possible to spot a same client on both the wired and the wireless systems.

Two separate application contexts are described hereafter.

In a first case, illustrated in FIG. 1, the wireless network is controlled. There is a set of access points, for example according to the 802.11 standard, distributed over the site of a company which make it possible for a visitor or for a portable device to access the internal network, via a secured tunnel (for example an IPsec tunnel). An equipment such as a gateway (for example IPsec) therefore forms the junction between the static part (wired) and the roaming part (radio). The possible double attachments in this case are between the wired network of the company and the wireless network of the same company.

The control of the wireless network of the company implies that it is possible to benefit from the same possibilities on both the radio and wired systems, namely:

knowing the DHCP requests and responses which are made on that network (either by interfacing with the DHCP server or by passive monitoring on the wired network and/or on the wireless network);

sending packets to any machine present on the network.

Consequently, the double attachment detection probe according to the invention can advantageously be connected to the wired network which interconnects the access points.

The principle of detection in this first case of FIG. 1 is described below. Typically, a client device CL initiates its connection under the following conditions:

the network cable CR of its equipment is connected to the internal wired networks RIF;

a radio interface IR of its equipment is activated and coupled with a radio network of the company RRE, via a legitimate access point AP.

The wireless network RRE and the wired networks RIF are connected to each other by a gateway GW. In this case a pirate PI can connect to the wireless network RRE via a Wi-Fi access point AP2 and take advantage of the double attachment of the legitimate client CL in order to access the wired network.

The probe SO, analyzing the DHCP requests and responses on the wired system DHCP-F and on the wireless system DHCP-SF, preferably operates as follows. When the equipment CL enters the phase of configuration of its network parameters, it sends DHCP requests through all of its interfaces. The probe according to the invention then uses certain fields in the DHCP packets sent by the client CL, in particular the information corresponding to the "Host Name" in option 12. An equipment name in option 12, generally defined during the network installation in a unique manner for each equipment, ensures the possibility of identifying the source of the DHCP requests. The options identifying the name of the equipment are in principle present in the DHCP packets (in particular the option 12 "Host Name"). Going further, it is advantageously possible also to make use of techniques of taking imprints of an equipment suspected of being in double attachment in order to have an even more reliable detection level, as will be seen below.

Two possible embodiments of the detection in the context of FIG. 1 are described below with reference to FIGS. 3A and 3B respectively.

Figure 3B:
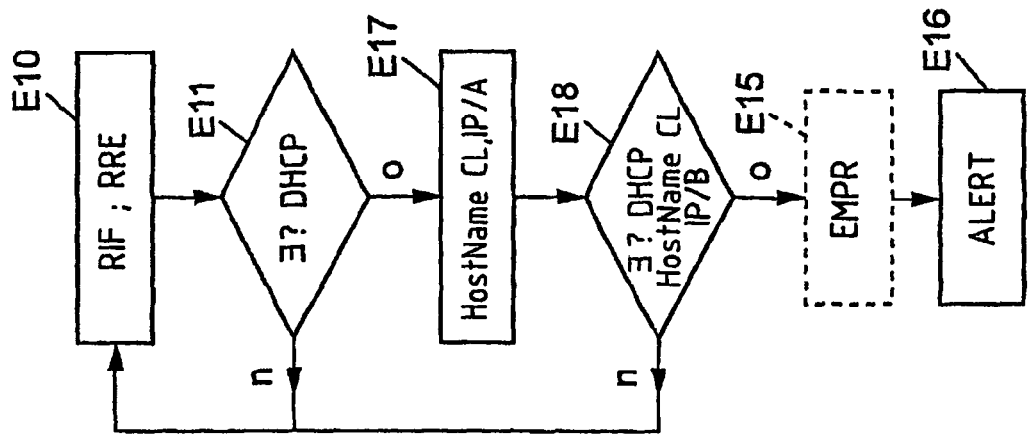
FIG. 3B illustrates the steps of a method according to the invention, in a second embodiment and, from there, a possible flowchart of the general algorithm of a computer program for the implementation of the invention according to a variant of FIG. 3A.
Figure 3A:
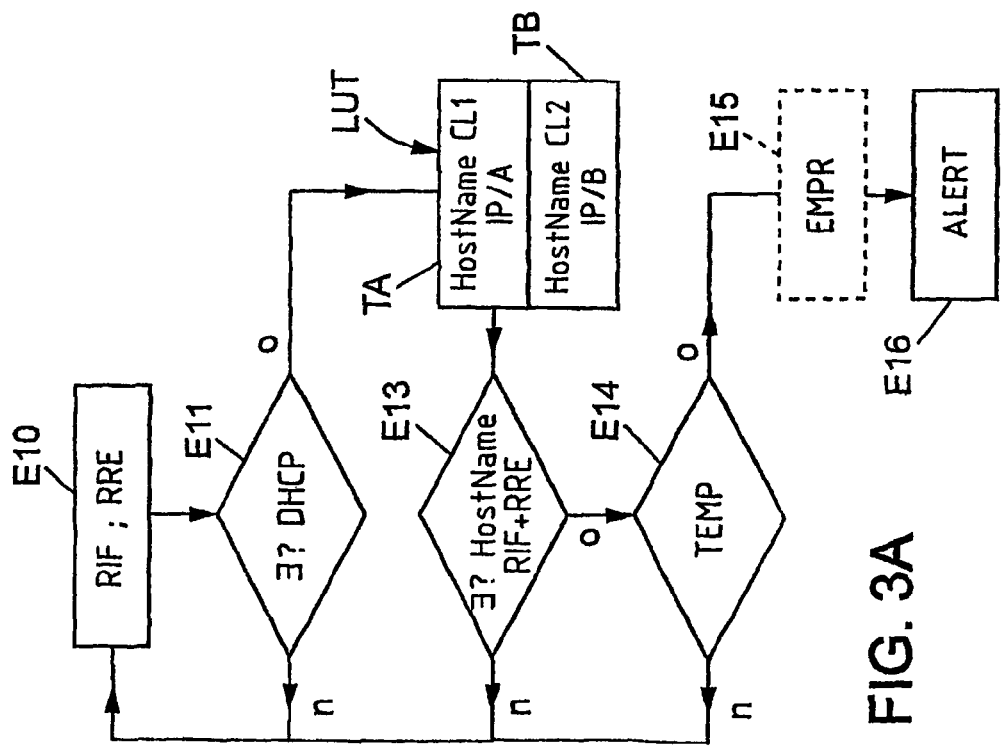
FIG. 3A illustrates the steps of a method according to the invention, in a first embodiment and, from there, a possible flowchart of the general algorithm of a computer program for the implementation of the invention.

Referring to FIG. 3A, in step E10, the probe monitors the DHCP requests on both systems (wired and radio). If the probe detects the reception of a DHCP request from a client connected on one system A (either the wired system or the radio system) in test E11, it extracts and analyzes the DHCP information which is the most pertinent and then stores it in a first connection table TA which puts the name identifying the client CL (Host Name) in correspondence with the IP address and other options appropriate to system A. The pertinence of the information stored in the connection table depends on search criteria used for the implementation of the invention. In particular it is stated that the useful information can be the previously described options 12, 55, 60 and 81.

Then, on reception of a DHCP request from the same client CL, but this time on system B (notation in which if system A is the wired system then system B is the radio system, and vice-versa), the probe extracts the DHCP information which is the most pertinent and then stores it in a second connection table TB which again places in correspondence the Host Name, the IP address and other option of system B. The probe compares the information in the two connection tables TA and TB using a discriminating criterion such as the identifying Host Name of the client. In particular, in test E13, if the same identifying Host Name is present in both connection tables at the same time for system A and for system B (arrow o at the output of test E13), that is to say in both in the wireless network and in the wired network, and being so within a predefined time window (at the output of the timing test E14), then a double attachment alarm can be raised in step E16. The time window used in the timing test E14 is advantageously defined according to the allocated leases in system A and in system B. The two connection tables TA and TB can of course be grouped in the same common connection table LUT or, at least, stored in a common memory.

In an optional embodiment, in order to confirm the pertinence of the alarm in step E16, it can then be advantageous to take an imprint of the system, both the wired system and the radio system (step E15 shown in dotted line in FIG. 3A). This imprint taking step E15 is preferably carried out before raising the alarm in step E16. Although advantageous, this imprint taking is not, in reality, in any way necessary for the implementation of the invention. In fact, there are cases where this imprint taking will not even be able to be implemented (for example in the case of a client who does not accept being interrogated).

On the other hand, it is advantageous to define the time window for the timing E14 correctly. The duration of the time interval between the DHCP requests, in both the wired and the radio systems, is a parameter which can be chosen according to the following compromise. The equipment in double attachment must be effectively present at the same time on the radio network and on the wired network such that the time interval should be relatively short. On the other hand, the identifying Host Name (for example on the wired system) was able to be allocated and the corresponding lease is still in force, whereas the client has just disconnected from the network.

A second possible embodiment will now be described with reference to FIG. 3B.

In this embodiment, the DHCP request on both systems (wired and radio) are monitored in step E10. It is stated that the monitoring on the radio system can be carried out using a wired equipment connected to the wireless network. The probe notes the reception of a DHCP request from a client on system A (step E11). It extracts and analyzes the most pertinent DHCP information, in particular the identifying Host Name, the IP address and other options in system A (step E17). The probe then interrogates, in test E18, the DHCP server in system B (DHCP-F or DHCP-SF), in order to know the IP address associated with the same identifying Host Name. If there is a response (arrow o at the output of test E18), then a double attachment alarm is raised in step E16.

Here again, it can be advantageous, in order to confirm the pertinence of the alarm, to take an imprint of the system (step E15), on the wired system and on the radio system.

In both embodiments, FIGS. 3A and 3B, the alarm raised can include many items of information which advantageously are chosen initially by a site administrator, as a configuration option of the probe according to the invention. In particular, the IP addresses on the wired and radio systems can be of interest in addition, of course, to the incriminated identifying Host Name.

Imprint taking E15 advantageously makes it possible to reduce the possibilities of false leases. In this case the suspicion of double attachment is paired with an active verification of the effective presence of the equipment in both networks (at the same time). Imprint taking consists, in particular, in sending a set of specific packets (called "stimuli") and then in analyzing responses making it possible to determine a certain number of characteristics of the client. It is for example possible to know the type and version of the operating system used in the equipment and the duration for which the equipment has been activated.

Finally, it will be understood that the two embodiments of FIGS. 3A and 3B are essentially distinguished in that, in the embodiment of FIG. 3A, the detection is carried out in a completely passive mode whereas, in the embodiment of FIG. 3B, the detection is carried out in a semi-active mode insofar as in this mode there is provided an active interrogation of a DHCP server of one of the networks as soon as there is detection of a DHCP request on the other network. It will therefore be understood that the timing E14 is not useful in this semi-active mode.

A second context of application of the invention will now be described with reference to FIG. 2. The most marked difference in this context of FIG. 2, in comparison with that described with reference to FIG. 1, is that here the radio part RAD is not controlled. The probe carries out the detection on the wired network RIF of the company (part FIL) and on the radio channel (part RAD) of any wireless network that does not belong to the company or is not administered by the company. The probe carries out monitoring at radio level by analyzing the frames, for example according to the 802.11 standard, sent via the wireless network in order to extract from them the useful information of the DHCP protocol. It is stated that the DHCP protocol is above the UDP protocol (in terms of "protocol layers"), which is above the IP protocol, which is again above the protocol according to IEEE-802.11. In this embodiment, the probe comprises specific means able to monitor the radio channel. It is also stated that the radio channel must be clear (not encoded) without any encoding/authentication mechanism having been used because, otherwise, the useful information would not be accessible to the probe. Moreover, it is advantageous to deploy a plurality of probes over a site to be monitored.

In this second particular context, the embodiments described with reference to FIGS. 3A and 3B can again be used. It will however be borne in mind that for the use of the embodiment of FIG. 3B, the company here has control only of the wired network and, in particular, access only to the DHCP server in the wired system. Thus, the probe in this case marks the reception of a DHCP request from a client on the wireless system (in step E11) and, in test E18, the DHCP server in the wired system (DHCP-F) is interrogated in order to know the IP address associated with the identifying Host Name which has been noted in steps E11 and E17.

Figure 2:
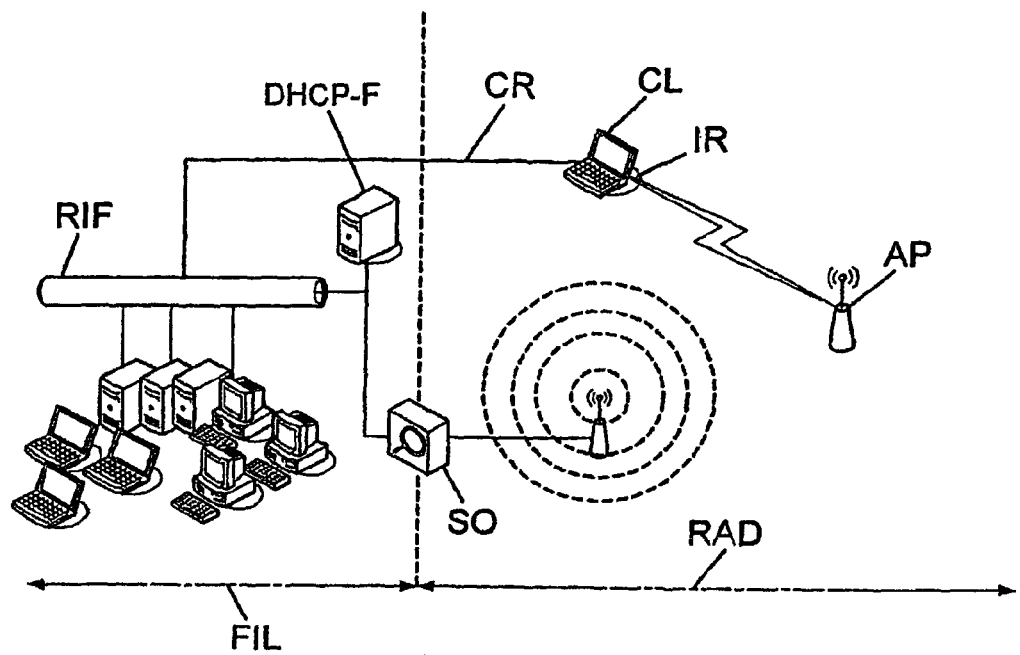
FIG. 2 is a diagrammatic illustration of an architecture in which the company controls only the wired network, in a second possible context of application of the present invention.

Moreover, in both embodiments and in the context of FIG. 2, the radio monitoring is carried out with a wireless equipment monitoring the radio system, preferably on each radio channel.

In order to provide the two possible contexts of FIGS. 1 and 2, even if the company has control of a wireless network, a probe according to the invention will preferably be equipped to monitor directly the radio system of any wireless network, roaming clients in effect being able to be associated with both the wireless networks of the company and with another wireless network.

Figure 4:
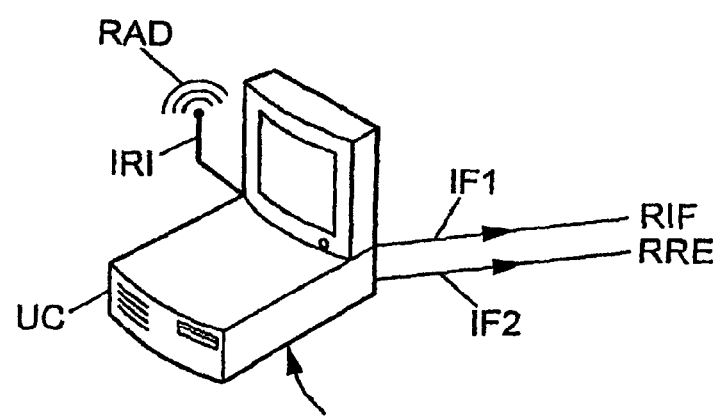
FIG. 4 is a diagrammatic representation of a device for the implementation of the invention.

This, with reference to FIG. 4, there will now be described a device, such as a probe of the abovementioned type, for the implementation of the invention. A computer ORD comprises two wired interfaces and one radio interface (in order to implement the two cases of FIGS. 1 and 2 described above). One wired interface IF1 is connected to the internal wired network RIF in order to interrogate the DNS/DHCP on the wired system and/or to monitor the internal network to retrieve the DHCP information. Another wired interface IF2 is connected to the wireless network of the company RRE interconnecting the radio access points in order to interrogate the DNS/DHCP in the radio system and/or to monitor the network behind the radio access points in order to retrieve the DHCP information. The radio interface IRI is in passive monitoring mode and makes it possible to trace all of the data packets passing on the radio system RAD, in particular the DHCP frames.

Monitoring on the different networks can be carried out by means of software that is known per se and using, for example, captures of the pcap type (tcpdump, ethereal or other types).

The interrogation of the DHCP servers (wired system and radio system) can be carried out by specific software interfacing. An interpretation of the content of the DHCP requests then makes it possible to raise subsequent alarms as previously described with reference to FIGS. 3A and 3B.

This software can, in general, be stored in the central processing unit UC of the computer ORD.

Thus, according to one of the advantages procured by the present invention, the protocols used for the detection of double attachment are commonly used and the implementation of the invention can therefore be integrated perfectly with existing software architectures. It suffices simply to add a probe with wired interconnections in order to carry out monitorings and interrogations.

According to another advantage, the probe can operate in semi-active mode (the context of FIG. 3A) or in completely passive mode (the context of FIG. 3B).

Moreover, the passive mode cannot be observed by a possible attacker. In reality, the semi-active mode is also non-observable by an attacker because the "active" aspect is always used on the wired system of the company, such that the requests remain invisible to an attacker coming from the wireless network.

The present invention is of course not limited to the embodiment described above by way of example; it extends to other variants.

In fact, in order to remain concise, the above description does not take into account the reaction of a network administrator in the event of double attachment detection.

It is simply mentioned here that the administrator to whom the alarm was sent can have a reaction such as searching for the incriminated equipment on the network infrastructure. It will therefore be understood that the invention can very well be coupled with equipment location mechanisms such that, after a location, an automatic reaction such as cutting off the wired connection of the equipment in a double attachment situation can be triggered.

A DHCP protocol for identifying an equipment in a situation of double attachment has been described above. However, other protocols making it possible to achieve the same result can be used as a variant. For example, it is possible to depend on network protocols making announcements and whose presented information can make it possible to identify an equipment.

For example, the SMB (Server Message Block) protocol corresponds to a series of protocols allowing several computers in a network to communicate with each other. One of its features is to proceed with announcement mechanisms according to which a host who joins a network announces his presence to all of the neighboring equipments (by broadcasting). These announcements are made at each connection to a network and also periodically.

In the design of this protocol, two interesting features can be used in the implementation of the invention. Firstly it is the facet that the announcements contain an equipment identifier, identical and independently from the interface on which the transmission is made. Then, the announcements contain a field which explicitly indicates if the host has several connections to networks (the "MultiHomed" option). The use of these two pieces of information makes it possible to enrich the information collected by the double attachment detection probe according to the invention in order to have increased detection efficiency.

Moreover, it is possible to enrich the implementation of the invention by using other network protocols which have a behavior such that the sendings of requests on the wired system and on the wireless system contain information unique to the client and which allow the client to be better identified.

A taking of imprint (step E15) by "stimuli" has been described above. However, other techniques can be envisaged. In fact, for the confirmation by imprint taking, it is possible to take an imprint, in a passive manner, of the services and operating systems used by the client, which has the advantage of not having to trigger stimuli in order to detect the client's properties. However, this technique makes it necessary to carry out, in parallel with the monitoring, an analysis not only over the DHCP frames as explained above, but also over certain fields of protocols (IP, UDP for "User Datagram Protocol", TCP for "Transport Control Protocol") which will make it possible to accurately identify intrinsic properties of the client on both the wired and radio systems.

The invention claimed is:

1. A method of detecting a situation of double attachment of a user equipment,
    said user equipment comprising:
        a first component configured to communicate with a wireless network, and
        a second component configured to communicate with a wired network,
        the double attachment situation being defined as concurrent connections of the user equipment to both the wireless network and the wired network,
    wherein the connections with the wired and the wireless networks are established by sending respective connection configuration requests, in accordance with a predetermined connection configuration protocol, from the user equipment, each of the respective connection configuration requests comprising a same user equipment identifier,
    wherein the user equipment identifier enables the identification of the user equipment within the connection configuration protocol,
    and wherein the method comprises:
        a) monitoring connection configuration requests sent on at least the wireless network,
        b) analyzing the content of the monitored connection configuration requests and extracting user equipment identifiers from the monitored connection configuration requests,
        c) determining whether a connection configuration request sent on at least the wired network comprises a user equipment identifier identical to at least one user equipment identifier which has been extracted, and
        d) raising an alarm if the determination is positive.

2. The method as claimed in claim 1, wherein:
    a) both the wireless network and the wired network are monitored for connection configuration requests sent by one or more pieces of equipment,
    b) the content of these requests is analyzed and equipment identifiers are extracted from them, both for the requests sent on the wireless network and for the requests sent on the wired network,
    c) by comparison of the equipment identifiers in the requests on the wired network, on the one hand, and on the wireless network, on the other hand, it is determined if piece of equipment has sent connection configuration requests both on the wired network and on the wireless network with the same identifier, and
    d) an alarm is raised if the result of said comparison is positive.

3. The method as claimed in claim 2, wherein a timing delay of chosen duration is applied between a positive comparison and an effective raising of the alarm.

4. The method as claimed in claim 2, wherein there is stored:
    in a first connection table, at least the equipment identifiers which have been extracted from the connection configuration requests on one of the networks among the wireless network and the wired network,
    in a second connection table, at least the equipment identifier which has been extracted from the connection configuration requests on the other one of the networks among the wireless network and the wired network, wherein a comparison is made between the respective contents of the first and second connection tables.

5. The method as claimed in claim 1, wherein connection configuration information is accessed in at least one server connected to the wired network wherein:
    a) connection configuration requests sent by one or more pieces of equipment are monitored, at least on the wireless network,
    b) the content of the connection configuration requests is analyzed and equipment identifiers are extracted from them,
    c) said server is interrogated on the basis of an equipment identifier which has been extracted in order to determine if that equipment has also sent a connection configuration request at least to the wired network with the same identifier, and
    d) an alarm is raised if the result of said determination is positive.

6. The method as claimed in claim 5, wherein connection configuration information is accessed on said server connected to the wired network and, additionally, on a second server connected to the wireless network, wherein:
    a) connection configuration requests sent by one or more pieces of equipment are monitored on both the wireless network and on the wired network,
    b) the content of the connection configuration requests is analyzed and equipment identifiers are extracted from it,
    and wherein, in interrogation, the first server or the second server is interrogated, on the basis of an equipment identifier which has been extracted from a request received on the wireless network or on the wired network respectively.

7. The method as claimed in claim 1, comprising taking an imprint of an equipment in a double attachment situation, this process comprising a sending of stimuli packets to that equipment and an analysis of responses from that equipment in order to determine characteristics of that equipment.

8. The method as claimed in claim 7, wherein the imprint taking is carried out before the effective raising of the alarm.

9. The method as claimed in claim 1, wherein said connection configuration protocol is a Dynamic Host Configuration Protocol (DHCP), and wherein the identifier of an equipment in the context of this protocol corresponds to a "Host Name".

10. A device for implementing a detection of a double attachment situation of a use equipment,
said equipment comprising:
a first component configured to communicate with a wireless network, and
a second component configured to communicate with a wired network,
the double attachment situation being defined as concurrent connections of the user equipment to both the wireless network and the wired network,
wherein the connections with the wired and the wireless networks are established by sending respective connection configuration requests, in accordance with a predetermined connection configuration protocol, from the user equipment, each of the respective connection configuration requests comprising a same user equipment identifier,
wherein the user equipment identifier enables the identification of the user equipment within the connection configuration protocol,
and wherein the device comprises:
a) a probe configured to monitor connection configuration requests sent on at least the wireless network,
b) a component configured to analyze the content of the monitored connection configuration requests and extract user equipment identifiers from the monitored connection configuration requests,
c) a component configured to determine whether a connection configuration request sent on at least the wired network comprises a user equipment identifier identical to at least one user equipment identifier extracted by the component configured to analyze the content of the monitored connection configuration requests, and
d) a component configured to raise an alarm if the determination made by the component configured to determine whether a connection configuration request sent on at least the wired network comprises a user equipment identifier identical to at least one user equipment identifier extracted by the component configured to analyze the content of the monitored connection configuration requests is positive.

11. The device as claimed in claim 10 where the detections of double attachment are comprised of:
between a wired network and a wireless network, managed by a same entity, and
between the wired network and any wireless network, comprising:
a radio probe for said any wireless network,
a wired probe for the wireless network managed by said entity, and
a wired probe for the wired network.

12. A non-transitory computer readable storage medium with a computer program product stored thereon, comprising instructions in computer code for detecting a situation of double attachment of a user equipment,
said user equipment comprising:
a first component configured to communicate with a wireless network, and
a second component configured to communicate with a wired network,
the double attachment situation being defined as concurrent connections of the user equipment to both the wireless network and the wired network,
wherein the connections with the wired and the wireless networks are established by sending respective connection configuration requests, in accordance with a predetermined connection configuration protocol, from the user equipment, each of the respective connection configuration requests comprising a same user equipment,
wherein the user equipment identifier enables the identification of the user equipment within the connection configuration protocol,
and wherein the instructions, when executed by a processor, cause the processor to:
a) monitor connection configuration requests sent on at least the wireless network,
b) analyze the content of the monitored connection configuration requests and extract user equipment identifiers from the monitored connection configuration requests,
c) determine whether a connection configuration request sent on at least the wired network comprises a user equipment identifier identical to at least one user equipment identifier which has been extracted, and
d) raise an alarm if the determination is positive.

* * * * *

UNITED STATES PATENT AND TRADEMARK OFFICE
CERTIFICATE OF CORRECTION

PATENT NO. : 8,724,506 B2  
APPLICATION NO. : 11/988559  
DATED : May 13, 2014  
INVENTOR(S) : Laurent Butti et al.

Page 1 of 1

It is certified that error appears in the above-identified patent and that said Letters Patent is hereby corrected as shown below:

In the specification,
In column 1 at line 38, Change "any:" to --any--.

In the claims,
In column 12 at line 52, In Claim 6, Change "wherein:" to --and wherein:--.

Signed and Sealed this
Eighth Day of December, 2015

Michelle K. Lee
*Director of the United States Patent and Trademark Office*